US012584991B2

(12) United States Patent
Han et al.

(10) Patent No.: US 12,584,991 B2
(45) Date of Patent: Mar. 24, 2026

(54) UWB-BASED IN-VEHICLE 3D LOCALIZATION OF MOBILE DEVICES

(71) Applicant: GM Global Technology Operations LLC, Detroit, MI (US)

(72) Inventors: Zijun Han, Rochester Hills, MI (US); Jinzhu Chen, Troy, MI (US); Aaron Adler, Rochester Hills, MI (US); Fan Bai, Ann Arbor, MI (US); John Sergakis, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 18/508,579

(22) Filed: Nov. 14, 2023

(65) Prior Publication Data

US 2025/0155541 A1 May 15, 2025

(51) Int. Cl.
*G01S 5/02* (2010.01)
*G01S 5/14* (2006.01)

(52) U.S. Cl.
CPC ............ *G01S 5/14* (2013.01); *G01S 5/02213* (2020.05); *G01S 5/0278* (2013.01)

(58) Field of Classification Search
CPC ...... G01S 5/0278; G01S 5/02213; G01S 5/14; G01S 2205/01; G01S 5/0284
See application file for complete search history.

(56) References Cited

U.S. PATENT DOCUMENTS

| | | | | |
|---|---|---|---|---|
| 2017/0052960 A1* | 2/2017 | Alizadeh-Shabdiz | ...................... G06F 16/285 |
| 2017/0123039 A1* | 5/2017 | Shin | ........................ G01S 5/10 |
| 2018/0038937 A1* | 2/2018 | Afzal | ................... G01S 5/0226 |
| 2018/0259614 A1* | 9/2018 | Gordon | ................ G01S 5/0289 |

(Continued)

FOREIGN PATENT DOCUMENTS

| | | | | | |
|---|---|---|---|---|---|
| CN | 110412507 A | * | 11/2019 | ......... H04W 64/006 |
| CN | 119172723 A | * | 12/2024 | ............. G06N 20/20 |

(Continued)

OTHER PUBLICATIONS

Dardari, Davide Falletti, Emanuela Luise, Marco, Satellite and Terrestrial Radio Positioning Techniques—A Signal Processing Perspective—1.3.1.1 Bayesian Estimators. (2012) Elsevier. p. 18 (Year: 2012).*

(Continued)

*Primary Examiner* — Jack W Keith
*Assistant Examiner* — John Bishoy Sam Abraham
(74) *Attorney, Agent, or Firm* — Vivacqua Crane, PLLC

(57) ABSTRACT

A method for in-vehicle localization of a mobile device includes receiving, in real time, sensor data from a plurality of UWB sensors inside a vehicle. The plurality of UWB sensors includes a plurality of UWB anchors and a UWB tag, which is part of the mobile device. The method further includes determining a plurality of location candidates of the UWB tag based on the sensor data received, determining a plurality of sensed current locations of the UWB tag and a plurality of probabilities for each of the plurality of sensed (Continued)

current locations of the UWB tag using a Gaussian Kernel Density Estimation (KDE), tracking a motion of the UWB tag, and determining a real-time position of the UWB tag using a Bayesian estimation.

15 Claims, 5 Drawing Sheets

(56) References Cited

U.S. PATENT DOCUMENTS

| | | | |
|---|---|---|---|
| 2020/0271747 A1* | 8/2020 | Wu | ........................ G01P 15/18 |
| 2022/0283321 A1* | 9/2022 | Ng | ....................... H04W 64/00 |

FOREIGN PATENT DOCUMENTS

| | | | | |
|---|---|---|---|---|
| KR | 102009791 B1 * | 8/2019 | .............. | G01S 5/06 |
| WO | WO-2016182964 A1 * | 11/2016 | ........... | G01S 5/0244 |

OTHER PUBLICATIONS

Costas J. Papachristou, Introduction to Mechanics of Particles and Systems, Chapter 2 Kinematics 2020 Springer Cham pp. 13-20 (Year: 2020).*
Wikipedia, Kernel Density Estimation [online], Mar. 14, 2022 [retrieved on Sep. 18, 2025]. Retrieved from the Internet :<URL:https://web.archive.org/web/20220314054 7 43/https://en. wikipedia.org/wiki/Kernel_ density_ estimation> p. 5 (Year: 2022).*

* cited by examiner

UWB-BASED IN-VEHICLE 3D LOCALIZATION OF MOBILE DEVICES

INTRODUCTION

The present disclosure relates to a system and method for ultra-wideband (UWB)-based in-vehicle 3D localization of mobile devices.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some systems use radiofrequency to determine whether a key fob is inside or outside of a vehicle. However, there is no system that can accurately determine the 3D location of a mobile device (e.g., key fob or smartphone) inside a vehicle. It is therefore to develop a system for ultra-wideband (UWB)-based in-vehicle 3D localization of mobile devices.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for in-vehicle localization of a mobile device. The method also includes receiving, in real time, sensor data from a plurality of UWB sensors inside a vehicle. The plurality of UWB sensors includes a plurality of UWB anchors each disposed in a fixed position inside the vehicle and at least one UWB tag that is not in a fixed position relative to the vehicle. The UWB tag is part of the mobile device. The sensor data includes a location information about the UWB anchors and a distance from the UWB tag to each of the UWB anchors. The method further includes determining a plurality of location candidates of the UWB tag based on the sensor data received from the plurality of UWB sensors. Further, the method includes determining a plurality of sensed current locations of the UWB tag and a plurality of probabilities for each of the plurality of sensed current locations of the UWB tag using a gaussian kernel density estimation (KDE) based on the location candidates of the UWB tag. Moreover, the method includes tracking a motion of the UWB tag using the plurality of sensed current locations of the UWB tag determined using the gaussian KDE. The method further includes determining a real-time position of the UWB tag using a Bayesian estimation, the plurality of sensed current locations of the UWB tag, the motion of the UWB tag, and the plurality of probabilities for each of the plurality of sensed current locations of the UWB tag. The method described in this paragraph improves vehicle technology by allowing and enhancing 3D localization of a mobile device (e.g., smartphone or key fob) inside a vehicle.

In some aspect of the present disclosures, each of the plurality of location candidates includes coordinates in a three-dimensional space. The plurality of UWB anchors includes a first UWB anchor, a second UWB anchor, and a third UWB anchor. Each of the plurality of location candidates of the UWB tag includes three-dimensional coordinates. The three-dimensional coordinates for each of the plurality of location candidates may be obtained using a following equations:

$$(x - x_1)^2 + (y - y_1)^2 + (z - z_1)^2 = r_1^2$$

$$(x - x_2)^2 + (y - y_2)^2 + (z - z_2)^2 = r_2^2$$

$$(x - x_3)^2 + (y - y_3)^2 + (z - z_3)^2 = r_3^2$$

where:

(x, y, z) are coordinates that represent a location of the UWB tag;

$(x_1, y_1, z_1)$ are coordinates that represent a location of the first UWB anchor;

$(x_2, y_2, z_2)$ are coordinates that represent a location of the second UWB anchor;

$(x_3, y_3, z_3)$ are coordinates that represent a location of the third UWB anchor; and $r_1$ is a measured distance from the UWB tag to the first UWB anchor;

$r_2$ is a measured distance from the UWB tag to the second UWB anchor; and $r_3$ is a measured distance from the UWB tag to the third UWB anchor.

The method may include determining a KDE bandwidth using Silverman's rule of thumb. The KDE bandwidth may be determined using the following equation:

$$h = 0.9 \left( \hat{\sigma}, \frac{IQR}{1.34} \right) n^{-\frac{1}{5}}$$

where:

h is the KDE bandwidth;

$\hat{\sigma}$ is a standard deviation of a dataset;

IQR is interquartile range, which is a measure of where ethe middle 50% of data of the dataset (between the 0.25 and 0.75 quantiles); and n is a number of samples in the dataset.

The motion of the UWB tag is tracked using the following equations:

$$L_k = L_{k-1} + \delta t * v + 0.5 * a * \delta t^2$$

$$p_{mot} = KDE(L_k)$$

where:

k is a timestamp;

$L_k$ is a current location at timestamp k;

$L_{k-1}$ is a previous location at timestamp k−1;

$\delta t$ is a time span between timestamp k and timestamp k−1 v is a moving speed of the UWB tag;

a is a movement acceleration of the UWB tag;

$p_{mot}$ is a probability matrix predicted by a motion tracking; and

KDE is a Kernel Density Estimation.

The Bayesian estimation uses the following equation:

$$\alpha = \max \left( p_{mot}^k * p_{mea}^k \right),$$

where:

$p_{mot}{}^k$ is the probability matrix predicted by the motion tracking;

$p_{mea}{}^k$ is a probability matrix predicted by a sensor measurement through the KDE; and $\alpha$ is a maximum probability chosen from element-wise-multiplication between $p_{mot}{}^k$ and $p_{mea}{}^k$.

The present disclosure further describes a system for in-vehicle localization of a mobile device. The system includes a plurality of UWB sensors inside a vehicle. The plurality of UWB sensors includes a plurality of UWB anchors each disposed in a fixed position inside the vehicle and at least one UWB tag that is not in a fixed position relative to the vehicle. The UWB tag is part of the mobile device. The system further includes a controller in communication with the plurality of UWB sensors. The controller is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
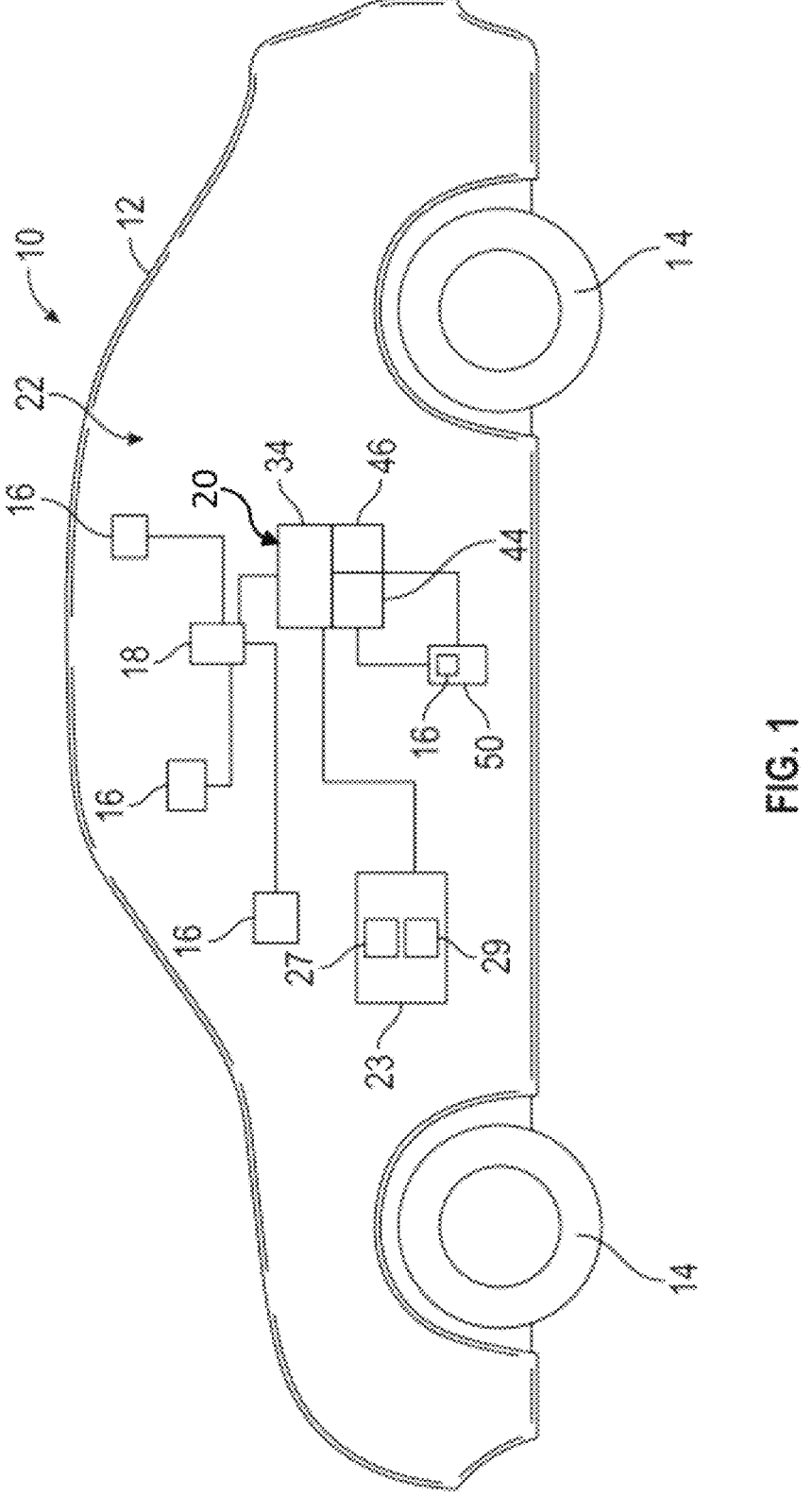
FIG. 1 is a schematic diagram of a vehicle including a system for UWB-based in-vehicle 3D localization of mobile devices.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a body 12 and a plurality of wheels 14 coupled to the body 12. The body 12 defines a passenger compartment 22. The vehicle 10 may be an autonomous vehicle. In the depicted embodiment, the vehicle 10 is depicted in the illustrated embodiment as a sedan, but it should be appreciated that other vehicles including trucks, coupes, sport utility vehicles (SUVs), recreational vehicles (RVs), etc., may also be used. A system 20 may be part or work together with the vehicle 10. The system 20 may be referred to as a system UWB-based in-vehicle 3D localization of mobile devices and may include a controller 34. The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 2) as described in detail below.

The instructions may include one or more separate programs, each of which comprises an ordered listing of executable instructions for implementing logical functions. The instructions, when executed by the processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

The vehicle 10 further includes a plurality of ultra-wideband (UWB) sensors 16 coupled to the vehicle body 12. The UWB sensors 16 that are coupled to the vehicle 10 serve as UWB anchors and are therefore in a fixed position relative to the vehicle 10. Specifically, the UWB sensors 16 that are coupled to the vehicle 10, such that these UWB sensors 16 remain stationary relative to the vehicle 10. Any suitable fastener, such as screws, bolts, among others, may be used to fix the UWB sensors 16 to the vehicle body 12. Each of the UWB sensors 16 may be configured as chipsets including a UWB transceiver. The UWB sensors 16 are in communication with the controller 34 and use two-way ranging to locate a mobile device 50. The mobile device 50 includes an UWB sensor 16 that serves as a UWB tag. The UWB sensor 16 of the mobile device 50 may be configured as a chipset including an UWB transceiver. The mobile device 50 may be smart phone, a tablet, a key fob, or any other device that is not physically connected to the vehicle 10 and includes the UWB sensor 16. In the present disclosure, the term "mobile device" is a piece of portable electronic equipment that can communicate with another device at least through UWB signals. The UWB sensor 16 that functions as a UWB tag initializes the ranging message, calculates the distance between the UWB tag and each of the UWB anchors, and publishes these distances and the location information. The UWB anchors listen to the UWB signals transmitted by the UWB tags and provides feedback. The vehicle 10 further includes a Message Queuing Telemetry Transport (MQTT) gateway 18 in communication with the UWB sensors 16. The MQTT gateway 18 collects the ranging and location messages from the UWB tag and suppers gateway deployment. The MQTT gateway 18 is in communication with the controller 34.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones (e.g., a microphone array) and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a person. Accordingly, the controller 34 is configured to receive inputs from the user via the user interface 23. The user interface 23 is also configured to output messages via the display 29 and/or speaker 27. For example, the user interface 23 may output a message indicative of the location of the mobile device 50 within the vehicle 10.

The UWB sensors 16, the controller 34, the user interface 23, and the MQTT gateway 18 are part of a system 20 for ultra-wideband (UWB)-based in-vehicle 3D localization of the mobile device 50. The system 20 employs a 3D localization algorithm (i.e., the method 100) to determine the fine-grained location of the mobile device 50 inside the vehicle passenger compart 22. The algorithm (i.e., the method 100) includes a location candidate proposal solution which accounts for the inaccuracy of individual UWB sensors 16. Further, algorithm (i.e., the method 100) includes a Gaussian Multicore Kernel Density Estimation (KDE) to estimate the location in the 3D space from the proposed location candidates. Lastly, a Bayesian analysis and motion tracking are applied to further improve the location accuracy. This algorithm (i.e., the method 100) achieves a fine-grain tracking accuracy (i.e., 0.32 m with 4 sensors; 0.14 m with 6 sensors) where individual sensor error is around 0.1 m.

Figure 2:
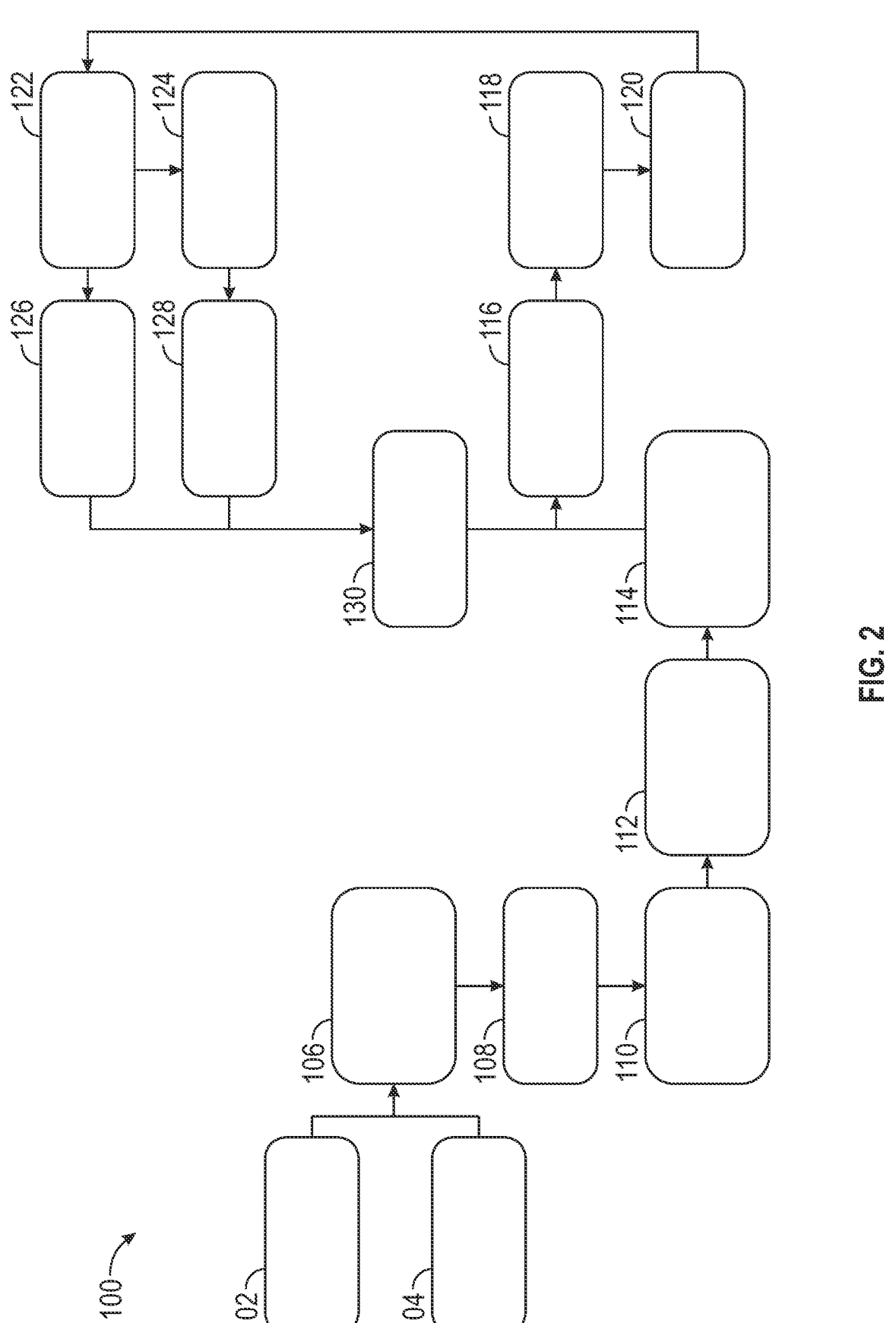
FIG. 2 is a flowchart of a method for UWB-based in-vehicle 3D localization of mobile devices.

FIG. 2 is a flowchart of a method 100 for ultra-wideband (UWB)-based in-vehicle 3D localization of the mobile device 50. The method 100 begins at blocks 102 and 104, which are the inputs. In other words, at blocks 102 and 104, the controller 34 receives, in real time, sensor data from a plurality of UWB sensors 16 inside the vehicle 10. The sensor data includes a location information about the UWB anchors and a distance from the UWB tag to each of the UWB anchors. Specifically, at block 102, the controller 34 receives the location information about the UWB anchors in the form of sensor 3D coordinates. At block 104, the controller 34 receives, in real-time, the distance UWB tag and each of the UWB anchors. As discussed above, the UWB sensors 16 (i.e., the UWB anchors and the UWB tag) use two-way ranging to locate a mobile device 50 and determine the distance between the UWB tag and each UWB anchor. Then, the method 100 continues block 106.

At block 106, the controller 34 executes a ranging data aggregator. In other words, the controller 34 aggregates the sensor data received from each UWB anchor (i.e., 3D location of the UWB tag and the distance from the UWB tag to the UWB tag). Next, the method 100 continues to block 108. At block 108, the controller 34 executes sensor grouping. For example, the controller 34 may group the UWB sensors 16 that function as UWB anchors in groups of three. Subsequently, the method 100 proceeds to block 110.

At block, the controller 34 determines a plurality of location candidates of the UWB tag based on the sensor data received from the plurality of UWB sensors 16 as discussed in detail below. Block 110 may be referred to as the location candidate proposal algorithm relies on sensor grouping and intersection computing in the 3D space. The location candidate proposal algorithm provides solutions for enriching the number of candidates due to inaccurate ranging measurements. Then, the method 100 continues to block 112.

At block 112, the controller 34 performs a customized multi-core Gaussian Kernel Density Estimation (KDE) using the plurality of location candidates of the UWB tag. At block 112, the core density and bandwidth for multi-core Gaussian KDE is selected. Then, the method 100 proceeds to block 114. At block 114, the controller 34 determines a plurality of sensed current locations of the UWB tag and a plurality of probabilities for each of the plurality of sensed current locations of the UWB tag using a Gaussian Kernel Density Estimation (KDE) based on the location candidates of the UWB tag. Next, the method 100 continues to block 116.

At block 116, the controller 34 performs a Bayesian estimation using the plurality of sensed current locations of the UWB tag and a plurality of probabilities for each of the plurality of sensed current locations of the UWB tag. The Bayesian estimation also uses the predicted location of the UWB tag as discussed below. Next, the controller 34 proceeds to block 118.

At block 118, the controller 34 determines a location estimation of the UWB tag (i.e., the mobile device 50) using the Bayesian estimation, the plurality of sensed current locations of the UWB tag, the motion of the UWB tag, and the plurality of probabilities for each of the plurality of sensed current locations of the UWB tag. Then, the method 100 continuous to block 120. At block 120, the controller 34 outputs the real-time location of the UWB tag, which corresponds to the location of the mobile device 50. At block 120, the controller 34 may command the user interface 23 to provide a notification via, for example, the display 29 and/or speaker 27. The notification indicates the 3D location of the mobile device 50 inside the vehicle 10. The method 100 then proceeds to block 122.

At block 122, the controller 34 records the real-time location of the UWB tag previously determined at block 120. Accordingly, the controller 34 contains a record of the previous locations of the UWB tag (i.e., the location of the mobile device 50). Then, the method 100 continues to block 124. At block 124, the controller 34 tracks the motion of the UWB tag using the plurality of sensed current locations of the UWB tag determined using the multi-core Gaussian KDE as discussed in detail below. At block 124, the controller 34 employs a kinematic motion tracking model for the prior probability analysis. As discussed above, the Gaussian KDE with sensed locations and probabilities are used for posterior probability analysis. After block 122, the method 100 also proceeds to block 126.

At block 126, the controller 34 outputs the previous locations of the UWB tag. After block 124, method 100 proceeds to block 128. At block 128, the controller 34 outputs the moving status of the UWB tag based on the movement tracked at block 124.

After blocks 126 and 128, the method 100 continues to block 130. At block 130, the controller 34 determines the predicted location of the UWB tag based on the previous location and the moving status of the UWB tag. This predicted location of the UWB tag is fed as an input into the Bayesian estimation model (i.e., block 116).

Figure 3:
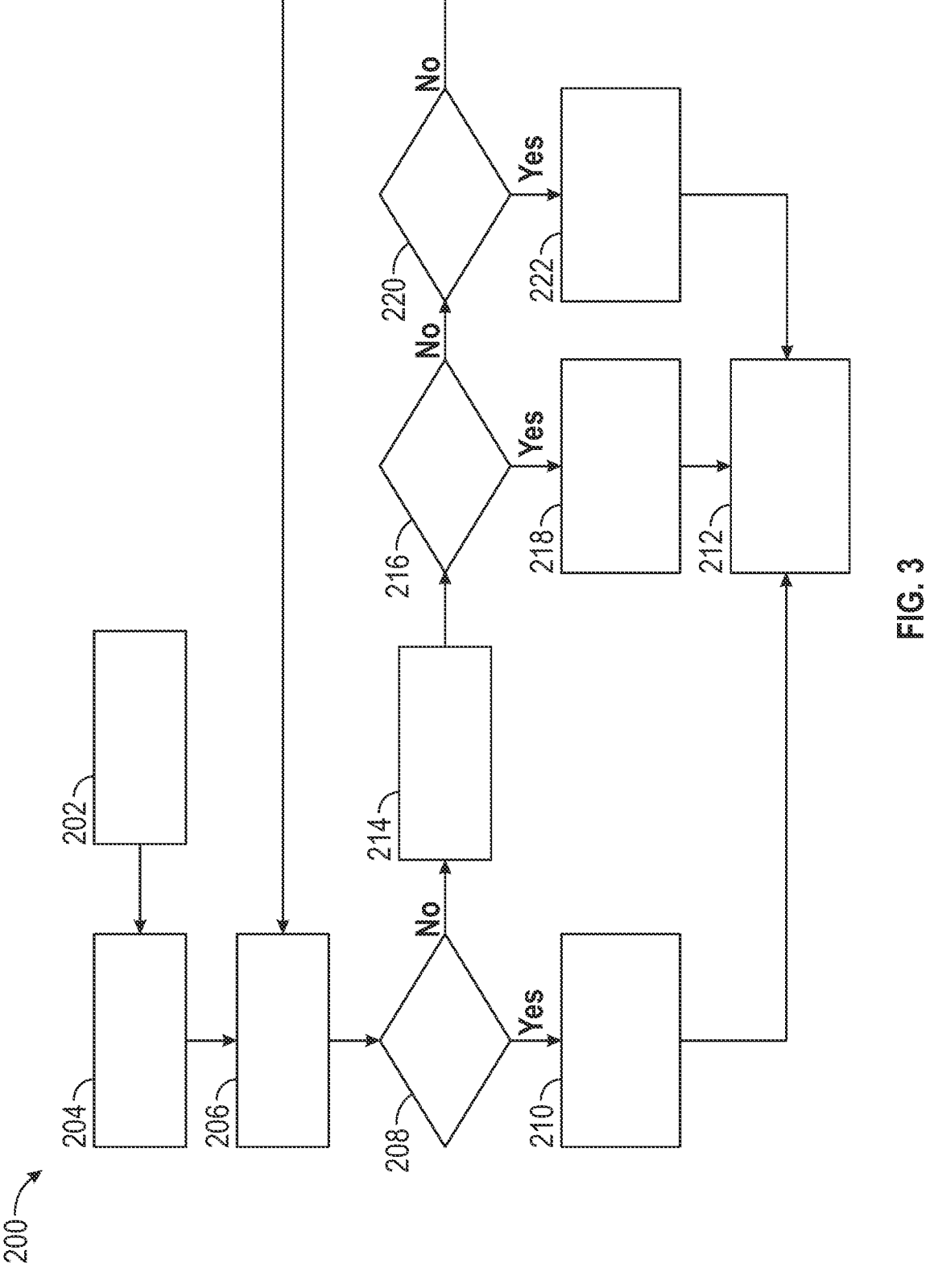
FIG. 3 is a flowchart of a method for location candidate selection.

FIG. 3 is a flowchart of a method 200 for location candidate selection as mentioned above with respect to block 110 of the method 100. The method 200 begins at block 202. At block 202, the controller 34 collects the sensor data (i.e., ranging data) from the UBW sensors 16. The sensor data includes a location information about the UWB anchors and a distance from the UWB tag to each of the UWB anchors. As discussed above with respect to the method 100, the controller 34 receives the sensor data from a group of UWB sensors 16. As a non-limiting example, each group may include three UWB sensors 16 (i.e., three UWB anchors) that produce two intersections in the 3D space. Then, the method 200 continues to block 204.

At block 204, the controller 34 performs a sphere construction for each UWB anchor. Each sphere is representative of the UWB anchor and its sensor data. Then, the method 200 continues to block 206. At block 206, three spheres are selected. Then, the method 200 continues to block 208.

At block 208, the controller 34 calculate a root, which is solution of the construct quadratic equation with respect to variable z. To do so, the following equations may be used:

$$(x - x_1)^2 + (y - y_1)^2 + (z - z_1)^2 = r_1^2 \qquad \text{Eq. 1}$$

$$(x - x_2)^2 + (y - y_2)^2 + (z - z_2)^2 = r_2^2 \qquad \text{Eq. 2}$$

$$(x - x_3)^2 + (y - y_3)^2 + (z - z_3)^2 = r_3^2 \qquad \text{Eq. 3}$$

where:

$(x, y, z)$ are coordinates that represent a location of the UWB tag;

$(x_1, y_1, z_1)$ are coordinates that represent a location of the first UWB anchor;

$(x_2, y_2, z_2)$ are coordinates that represent a location of the second UWB anchor;

$(x_3, y_3, z_3)$ are coordinates that represent a location of the third UWB anchor;

$r_1$ is a measured distance from the UWB tag to the first UWB anchor;

$r_2$ is a measured distance from the UWB tag to the second UWB anchor; and $r_3$ is a measured distance from the UWB tag to the third UWB anchor.

Then, a subtraction on each pair of the above equations is conducted as follows:

$$k_1 = r_1^2 - r_2^2 - x_1^2 + x_2^2 - y_1^2 + y_2^2 - z_1^2 + z_2^2$$

$$a_1 = 2(x_2 - x_1); b_1 = 2(x_2 - x_1); c_1 = 2(x_2 - x_1);$$

$$k_3 = r_3^2 - r_2^2 - x_3^2 + x_2^2 - y_3^2 + y_2^2 - z_3^2 + z_2^2$$

$$a_3 = 2(x_2 - x_3); b_3 = 2(x_2 - x_3); c_3 = 2(x_2 - x_3)$$

where:

$k_1$ is the subtraction of Equation 2 from Equation 1 above;

$k_2$ is the subtraction of Equation 2 from Equation 3 above;

$r_1$ is a measured distance from the UWB tag to the first UWB anchor;

$r_2$ is a measured distance from the UWB tag to the second UWB anchor;

$r_3$ is a measured distance from the UWB tag to the third UWB anchor;

$(x, y, z)$ are coordinates that represent a location of the UWB tag;

$(x_1, y_1, z_1)$ are coordinates that represent a location of the first UWB anchor;

$(x_2, y_2, z_2)$ are coordinates that represent a location of the second UWB anchor;

$(x_3, y_3, z_3)$ are coordinates that represent a location of the third UWB anchor; and $a_1, b_1, c_1, a_3, b_3$, and $c_3$ are intermediate terms that are constructed and used to make the root equation shorter.

Then, the equations above are arranged in a quadratic form $Az^2 + Bz + C = 0$, where A, B, and C are constant in solving the quadratic equations groups (i.e., Equations 1, 2, and 3) with three variables $(x,y,z)$. To do so, the following equations may be used:

$$e = -\left(\frac{a_3 c_1}{a_1} - c_3\right) \Big/ \left(\frac{a_3 b_1}{a_1} - b_3\right)$$

$$f = \left(\frac{a_3 k_1}{a_1} - k_3\right) \Big/ \left(\frac{a_3 b_1}{b_1} - b_3\right)$$

$$g = -\left(\frac{b_3 c_1}{b_1} - c_3\right) \Big/ \left(\frac{b_3 a_1}{b_1} - a_3\right)$$

$$h = \left(\frac{b_3 k_1}{b_1} - k_3\right) \Big/ \left(\frac{b_3 a_1}{b_1} - a_3\right)$$

$$A = g^2 + e^2 + 1$$

$$B = -x_1 g - y_1 e - 2z_1 - x_1 g - y_1 e + 2gh + 2ef$$

$$C = x_1^2 + y_1^2 + z_1^2 - 2x_1 h - 2y_1 f + h^2 + f^2 - r_1^2$$

$$\text{root} = B^2 - 4AC$$

where:

A, B, and C are constant in solving the quadratic equations groups (i.e., Equations 1, 2, and 3) with three variables $(x,y,z)$;

$a_1, b_1, c_1, a_3, b_3, c_3$, e, f, g, and h are intermediate terms that are constructed and used to make the root equation shorter;

$k_1$ is the subtraction of Equation 2 from Equation 1 above;

$k_2$ is the subtraction of Equation 2 from Equation 3 above;

$(x_1, y_1, z_1)$ are coordinates that represent a location of the first UWB anchor;

$r_1$ is a measured distance from the UWB tag to the first UWB anchor; and root is a solution of the construct quadratic equation with respect to variable z.

At block 208, the controller 34 determines whether the root is equal to or greater than zero. The intersection of the spheres may only be obtained when the root is equal to or greater than zero. Next, the method 200 proceeds to block 210. At block 210, the intersection between two spheres may be determined. These two symmetric solutions (i.e., intersections) may be determined using the following equations:

$$z^+ = \frac{\text{root} - B}{2A};. \; x^+ = gz^+ + h;. \; y^+ = ez^- + f;$$

$$z^- = \frac{-\text{root} - B}{2A};. \; x^- = gz^- + h;. \; y^- = ez^- + f$$

where:

$(z^+, y^+, z^+)$ and $(z^+, y^+, z^+)$ are a pair of symmetric solutions representing the potential location of the UWB tag in the three-sensor model;

root is a solution of the construct quadratic equation with respect to variable z;

A and B are constant in solving the quadratic equations groups (i.e., Equations 1, 2, and 3) with three variables (x,y,z); and f, g, and h are intermediate terms that are constructed and used to make the root equation shorter.

Then, the method 200 continues to block 212. At block 212, the controller 34 merges the location candidates. As discussed above, the locations candidates of the UWB tag are the coordinates $(z^+, y^+, z^+)$ and $(z^+, y^+, z^+)$ mentioned above. Due to the inaccuracy of the range measurements, the above solutions (i.e., $(z^+, y^+, z^+)$ and $(z^+, y^+, z^+)$) may not exist. As a result, not enough number of intersections are proposed due to the limited number of sensors and the ranging inaccuracy. For example, when the root is less than zero, the 3-sensor model discussed above should not be used. The solution is therefore to enrich the number of potential solutions by extending the grouping strategy and considering the case of each pair of two spheres. Therefore, if the root is less than zero, the method 200 proceeds to block 214.

At block 214, the controller 34 picks two spheres. Each sphere is representative of the UWB anchor and its sensor data. The method 100 then continues to block 216. At block 216, the controller 34 determines the distance between the two spheres. To do so, the controller 34 may use the following equation:

Let $d = D(o_1, o_2)$, if $d > r_1 + r_2$:

$$x = x_1 \frac{d - r_1}{d} + x_2 * \frac{r_1}{d}, \; y = y_1 \frac{d - r_1}{d} + y_2 * \frac{r_1}{d}, \; z = z_1 \frac{d - r_1}{d} + z_2 * \frac{r_1}{d}$$

Otherwise, if $d < r_1 - r_2$ or. $d < r_2 - r_1$:

$$x = x_1 + \frac{|x_2 - x_1|}{d} r_1, \; y = y_1 + \frac{|y_2 - y_1|}{d} r_1, \; z = z_1 + \frac{|z_2 - z_1|}{d} r_1,$$

where:

d is the distance between the two spheres;

$o_1$ is the center of one of the two spheres;

$o_2$ is the center of another one of the two spheres;

$(x_1, y_1, z_1)$ are coordinates that represent a location of the first UWB anchor;

$(x_2, y_2, z_2)$ are coordinates that represent a location of the second UWB anchor;

$r_1$ is a measured distance from the UWB tag to the first UWB anchor;

$r_2$ is a measured distance from the UWB tag to the second UWB anchor; and $(x, y, z)$ represents the extended potential location of the UWB tag in the two-sensor model.

At block 216, the controller 34 determines whether the distance between the two spheres is greater than the sum of the measured distance from the UWB tag to the first UWB anchor and the measured distance from the UWB tag to the second UWB anchor (i.e., $d > r_1 + r_2$). If the distance between the two spheres is greater than the sum of the measured distance from the UWB tag to the first UWB anchor and the measured distance from the UWB tag to the second UWB anchor (i.e., $d > r_1 + r_2$), the method 200 proceeds to block 218. At block 218, the controller 34 finds the outer separation points using the equations above to determine the location candidates of the UWB tag. Then, the method 200 continues to block 212. At block 212, the controller 34 merges the location candidates. If the distance between the two spheres is greater than the sum of the measured distance from the UWB tag to the first UWB anchor and the measured distance from the UWB tag to the second UWB anchor (i.e., $d > r_1 + r_2$), the method 100 continues to block 220. At block 220, the controller 34 determines whether the distance between the two spheres is less than the absolute value of the sum of the measured distance from the UWB tag to the first UWB anchor and the measured distance from the UWB tag to the second UWB anchor (i.e., $d < |r_1 + r_2|$). If the distance between the two spheres is less than the absolute value of the sum of the measured distance from the UWB tag to the first UWB anchor and the measured distance from the UWB tag to the second UWB anchor (i.e., $d < |r_1 + r_2|$), then the method 200 continues to block 222. At block 22, the controller 34 finds the inner separation points using the equations above to determine the location candidates of the UWB tag. Then, the method 200 continues to block 212. At block 212, the controller 34 merges the location candidates.

Figure 4:
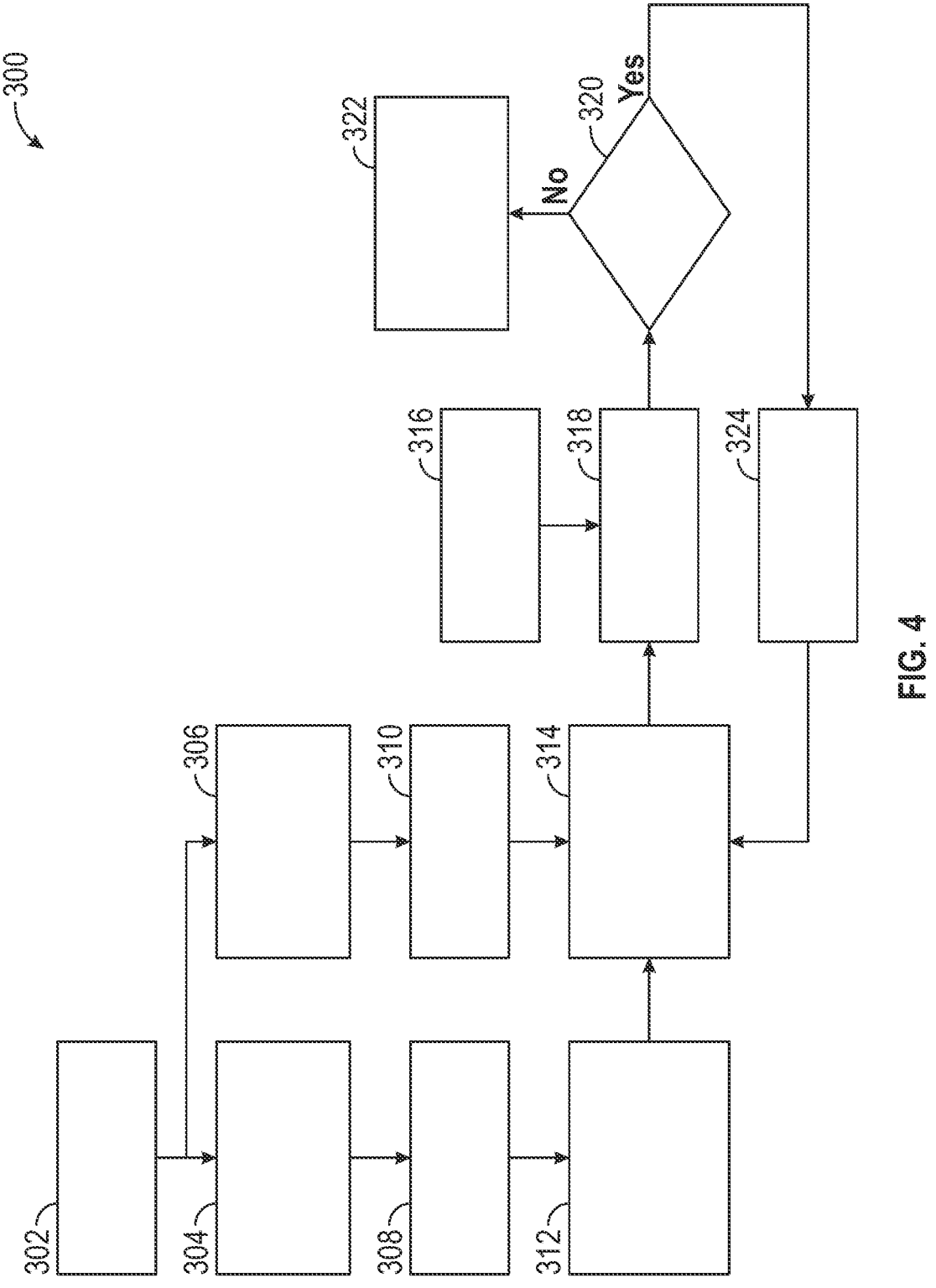
FIG. 4 is a flowchart of a method for a multi-core Gaussian kernel density estimation (KDE).

FIG. 4 is a flowchart of a method 300 for a multi-core Gaussian kernel density estimation (KDE). The method 300 begins at block 302. At block 302, the controller 34 receives the location candidates previously determined using the method 200. Then, the method 300 continuous to block 304 and block 306. At block 304, the controller initiates the Gaussian KDE. At block 306, the controller 34 determines the bandwidth and the density of the Gaussian KDE. The density selection involves several considerations. A higher density may produce high localization granularity, while lower density is more computational friendly. The ranging error of the UWB sensors 16 is claimed at centimeter level. In addition, it is assumed the interior space of any car is under $2 \times 2 \times 2$ m$^3$. Thus, a 3D kernel size of 64,000 ($40 \times 40 \times 40$) may reach a 50 mm localization granularity. Further, both the Scott's and Silverman's rule of thumb may be used, but the Silverman's rule is recommended because it is more robust. Silverman's rule works extremely fast and produces an excellent bandwidth value for the normal distribution and distributions close to the normal. Silverman's rule of thumb defaults to 0.9 times the minimum of the standard deviation and the interquartile range divided by 1.34 times the sample size to the negative one-fifth power. The higher the bandwidth is, the smoother curves are. However, if setting the bandwidth too large, the accuracy goes lower. Thus, the estimated optimal bandwidth of the Gaussian KDE is selected based on the Silverman's rule of thumb using the following equation:

$$h = 0.9 \left( \hat{\sigma}, \frac{IQR}{1.34} \right) n^{-\frac{1}{5}}$$

where:

h is the KDE bandwidth;

$\hat{\sigma}$ is a standard deviation of a dataset;

IQR is interquartile range, which is a measure of where the middle 50% of data of the dataset (between the 0.25 and 0.75 quantiles); and n is a number of samples in the dataset.

Then, the method 300 continues to block 308 and block 310. At block 308, the controller 34 fits the Gaussian KDE model. At block 310, the controller 34 constructs a 3D probability map. Then, the method 300 continues to block 312 and block 314.

At block 312, the controller 34 sets the default bandwidth selected using the Silverman's rule of thumb discussed above. At block 314, the controller 34 updates the probabilities based on the distance measurements by the UWB sensors 16. Then, the method 300 continues to block 316 and block 318. At block 316, the controller 34 receives a probability threshold. At block 318, the controller 34 counts the valid points. The valid points are the points which probability is greater than the probability threshold. Then, the method 300 proceeds to block 320.

At block 320, the controller 34 determines if the number of valid points is greater than a predetermined number of counts. If the number of valid points is greater than a predetermined number of counts, then the method 300 continues to block 322. At block 322, the controller 34 determines the plurality of sensed current locations of the UWB tag and a plurality of probabilities for each of the plurality of sensed current locations of the UWB tag. If the number of valid points is greater than a predetermined number of counts, then the method 300 continues to block 324. At block 324, the controller 34 decreases the KDE bandwidth by a predetermined amount. Then, the method 300 returns to block 314.

Figure 5:
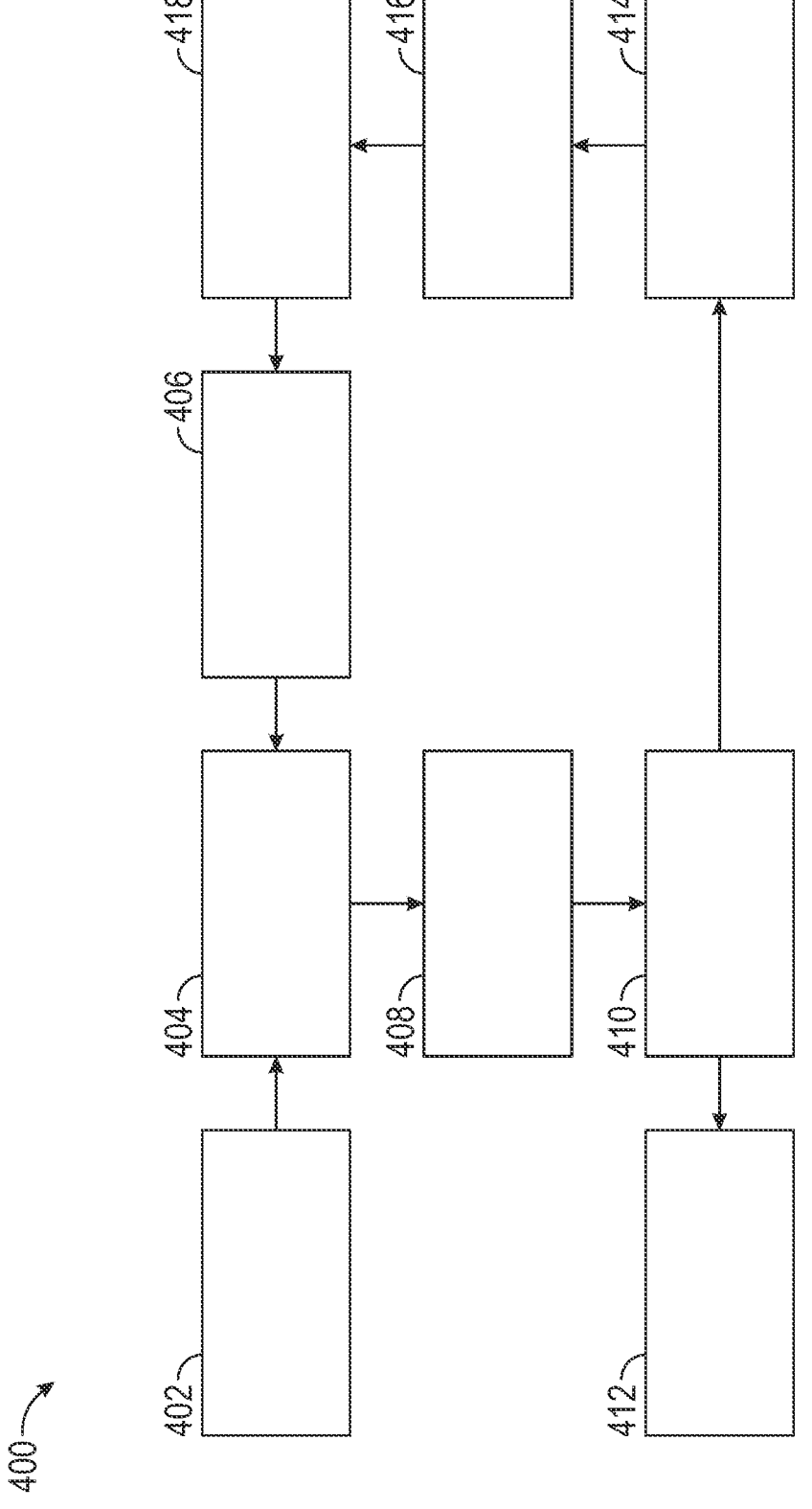
FIG. 5 is a flowchart of a method for motion tracking and Bayesian filtering.

FIG. 5 is a flowchart of a method 400 for motion tracking and Bayesian filtering as mentioned above with respect to blocks 124 and block 116 of FIG. 2. The method 400 begins at block 402. At block 402, the controller 34 receives the plurality of sensed current locations of the UWB tag and a plurality of probabilities for each of the plurality of sensed current locations of the UWB tag previously determined using the method 300. Then, the method 400 continues to block 404. At block 404, the controller 34 tracks the motion of the UWB tag using the plurality of sensed current locations to determine the posterior location probabilities of the UWB tag. At block 406, the method 400 receives the prior location probabilities of the UWB tag. The prior location probabilities of the UWB tag are used to determine the posterior location probabilities at block 404. The controller 34 may use the following equations to determine location of the UWB tag as well as the probability matrix predicted by the motion tracking:

$$L_k = L_{k-1} + \delta t * v + 0.5 * a * \delta t^2$$

$$p_{mot} = KDE(L_k)$$

where:

k is a timestamp;

$L_k$ is a current location at timestamp k;

$L_{k-1}$ is a previous location at timestamp k−1;

δt is a time span between timestamp k and timestamp k−1 v is a moving speed of the UWB tag;

a is a movement acceleration of the UWB tag;

$p_{mot}$ is a probability matrix predicted by a motion tracking; and

KDE is a Kernel Density Estimation.

After block 404, the method 400 proceeds to block 408. At block 408, a customized Bayesian approach (i.e., a Bayesian estimation) considering the sensor measurements and the posterior location probability is used to estimate the tracked object location (i.e., the location of the UWB tag). Then, the controller 34 selects the location in the KDE matrix with the maximum probability using the following equation:

$$\alpha = \max\left(p_{mot}^k * p_{mea}^k\right),$$

where:

$p_{mot}^k$ is the probability matrix predicted by the motion tracking;

$p_{mea}^k$ is a probability matrix predicted by a sensor measurement through the KDE; and α is a maximum probability chosen from element-wise-multiplication between $p_{mot}^k$ and $p_{mea}^k$.

After block 408, the method 400 proceeds to block 410. At block 410, the final real-time location of the UWB tag within the vehicle 10 is determined using the equation above. After block 410, the method 400 proceeds to block 412 and block 414. At block 412, the controller 34 outputs the final real-time location of the UWB tag within the vehicle 10. As a non-limiting example, the controller 34 may command the user interface 23 to provide a notification via, for example, the display 29 and/or speaker 27. The notification indicates the real-time 3D location of the mobile device 50 inside the vehicle 10. At block 414, the controller 34 caches the real-time location of the mobile device 50 inside the vehicle 10. Then, the method 400 continues to block 416. At block 416, the controller 34 tracks the motion of the UWB tag as described above. Then, the method 400 continues to block 418. At block 418, the controller 34 predicts the location of the UWB tag in the next frame with the motion tracking equation described above. Then, the method 400 continues to block 406. At block 406, the controller 34 determines the prior location probabilities of the UWB tag using the predicted location of the UWB tag on the next frame.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for in-vehicle localization of a mobile device, comprising:
  receiving, in real time, sensor data from a plurality of ultra-wideband (UWB) sensors inside a vehicle, wherein the plurality of UWB sensors includes a plurality of UWB anchors each disposed in a fixed position inside the vehicle and at least one UWB tag that is not in a fixed position relative to the vehicle, the UWB tag is part of the mobile device, and the sensor data includes a location information about the UWB anchors and a distance from the UWB tag to each of the UWB anchors;

determining a plurality of location candidates of the UWB tag based on the sensor data received from the plurality of UWB sensors;

determining a plurality of sensed current locations of the UWB tag and a plurality of probabilities for each of the plurality of sensed current locations of the UWB tag using a Gaussian Kernel Density Estimation (KDE) based on the location candidates of the UWB tag;

tracking a motion of the UWB tag by generating a probability matrix ($p_{mot}$) through applying a Gaussian KDE to motion-predicted locations (Lk), wherein the probability matrix represents a distribution of possible tag locations over time; and determining a real-time location of the UWB tag by Bayesian estimation that multiplies the probability matrix (pmot) with a probability matrix ($p_{mea}$) generated from sensed current locations of the UWB tag via Gaussian KDE, and selecting a maximum probability from the resulting distribution within the vehicle, wherein the motion of the UWB tag is tracked using a following equations:

$$L_k = L_{k-1} + \delta t * v + 0.5 * a * \delta t^2$$

$$p_{mot} = KDE(L_k)$$

where:
k is a timestamp;
$L_k$ is a current location at timestamp k;
$L_{k-1}$ is a previous location at timestamp k−1;
δt is a time span between timestamp k and timestamp k−1
v is a moving speed of the UWB tag;
a is a movement acceleration of the UWB tag:
$p_{mot}$ is a probability matrix predicted by a motion tracking; and
KDE is a Kernel Density Estimation,
  wherein the Bayesian estimation uses a following equation:

$$\alpha = \max\left(p_{mot}^k * p_{mea}^k\right),$$

where:
$p_{mot}^k$ is the probability matrix predicted by the motion tracking;
$p_{mea}^k$ is a probability matrix predicted by a sensor measurement through the KDE; and
α is a maximum probability chosen from element-wise-multiplication between $p_{mot}^k$ and $p_{mea}^k$.

2. The method of claim 1, wherein each of the plurality of location candidates includes coordinates in a three-dimensional space.

3. The method of claim 2, wherein the plurality of UWB anchors includes a first UWB anchor, a second UWB anchor, and a third UWB anchor, each of the plurality of location candidates of the UWB tag includes three-dimensional coordinates, and the three-dimensional coordinates for each of the plurality of location candidates is obtained using a following equations:

$$(x - x_1)^2 + (y - y_1)^2 + (z - z_1)^2 = r_1^2$$
$$(x - x_2)^2 + (y - y_2)^2 + (z - z_2)^2 = r_2^2$$
$$(x - x_3)^2 + (y - y_3)^2 + (z - z_3)^2 = r_3^2$$

where:

(x, y, z) are coordinates that represent a location of the UWB tag;

$(x_1, y_1, z_1)$ are coordinates that represent a location of the first UWB anchor;

$(x_2, y_2, z_2)$ are coordinates that represent a location of the second UWB anchor;

$(x_3, y_3, z_3)$ are coordinates that represent a location of the third UWB anchor; and $r_1$ is a measured distance from the UWB tag to the first UWB anchor;

$r_2$ is a measured distance from the UWB tag to the second UWB anchor; and $r_3$ is a measured distance from the UWB tag to the third UWB anchor.

4. The method of claim 3, further comprising determining a KDE bandwidth using Silverman's rule of thumb.

5. The method of claim 4, wherein the KDE bandwidth is determined using a following equation:

$$h = 0.9\left(\hat{\sigma}, \frac{IQR}{1.34}\right)n^{-\frac{1}{5}}$$

where:

h is the KDE bandwidth;

$\hat{\sigma}$ is a standard deviation of a dataset;

IQR is interquartile range, which is a measure of where ethe middle 50% of data of the dataset (between the 0.25 and 0.75 quantiles); and n is a number of samples in the dataset.

6. A system for in-vehicle localization of a mobile device, comprising:

a plurality of ultra-wideband (UWB) sensors inside a vehicle, wherein the plurality of UWB sensors includes a plurality of UWB anchors each disposed in a fixed position inside the vehicle and at least one UWB tag that is not in a fixed position relative to the vehicle, and the UWB tag is part of the mobile device;

a controller in communication with the plurality of UWB sensors, wherein the controller is programmed to:

receiving, in real time, sensor data from the plurality of UWB sensors, wherein the sensor data includes a location information about the UWB anchors and a distance from the UWB tag to each of the UWB anchors;

determine a plurality of location candidates of the UWB tag based on the sensor data received from the plurality of UWB sensors;

determine a plurality of sensed current locations of the UWB tag and a plurality of probabilities for each of the plurality of sensed current locations of the UWB tag using a Gaussian Kernel Density Estimation (KDE) based on the location candidates of the UWB tag;

track a motion of the UWB tag by generating a probability matrix ($p_{mot}$) through applying a Gaussian KDE to motion-predicted locations (Lk), wherein the probability matrix represents a distribution of possible tag locations over time; and determine a real-time location of the UWB tag by Bayesian estimation that multiplies the probability matrix (pmot) with a probability matrix ($p_{mea}$) generated from sensed current locations of the UWB tag via Gaussian KDE, and selecting a maximum probability from the resulting distribution within the vehicle, wherein the motion of the UWB tag is tracked using a following equations:

$$L_k = L_{k-1} + \delta t * v + 0.5 * a * \delta t^2$$
$$p_{mot} = KDE(L_k)$$

where:

k is a timestamp;

$L_k$ is a current location at timestamp k;

$L_{k-1}$ is a previous location at timestamp k−1;

$\delta t$ is a time span between timestamp k and timestamp k−1 v is a moving speed of the UWB tag;

a is a movement acceleration of the UWB tag:

$p_{mot}$ is a probability matrix predicted by a motion tracking; and

KDE is a Kernel Density Estimation, wherein the Bayesian estimation uses a following equation:

$$\alpha = \max\left(p_{mot}^k * p_{mea}^k\right),$$

where:

$p_{mot}^k$ is the probability matrix predicted by the motion tracking;

$p_{mea}^k$ is a probability matrix predicted by a sensor measurement through the KDE; and $\alpha$ is a maximum probability chosen from element-wise-multiplication between $p_{mot}^k$ and $p_{mea}^k$.

7. The system of claim 6, wherein each of the plurality of location candidates includes coordinates in a three-dimensional space.

8. The system of claim 7, wherein the plurality of UWB anchors includes a first UWB anchor, a second UWB anchor, and a third UWB anchor, each of the plurality of location candidates of the UWB tag includes three-dimensional coordinates, and the three-dimensional coordinates for each of the plurality of location candidates is obtained using a following equations:

$$(x - x_1)^2 + (y - y_1)^2 + (z - z_1)^2 = r_1^2$$
$$(x - x_2)^2 + (y - y_2)^2 + (z - z_2)^2 = r_2^2$$
$$(x - x_3)^2 + (y - y_3)^2 + (z - z_3)^2 = r_3^2$$

where:

(x, y, z) are coordinates that represent a location of the UWB tag;

$(x_1, y_1, z_1)$ are coordinates that represent a location of the first UWB anchor;

$(x_2, y_2, z_2)$ are coordinates that represent a location of the second UWB anchor;

$(x_3, y_3, z_3)$ are coordinates that represent a location of the third UWB anchor;

$r_1$ is a measured distance from the UWB tag to the first UWB anchor;

$r_2$ is a measured distance from the UWB tag to the second UWB anchor; and $r_3$ is a measured distance from the UWB tag to the third UWB anchor.

9. The system of claim 8, wherein the controller is further programmed to determine a KDE bandwidth using Silverman's rule of thumb.

10. The system of claim 9, wherein the KDE bandwidth is determined using a following equation:

$$h = 0.9\left(\hat{\sigma}, \frac{IQR}{1.34}\right)n^{-\frac{1}{5}}$$

where:

h is the KDE bandwidth;

$\hat{\sigma}$ is a standard deviation of a dataset;

IQR is interquartile range, which is a measure of where ethe middle 50% of data of the dataset (between the 0.25 and 0.75 quantiles); and n is a number of samples in the dataset.

11. A tangible, non-transitory, machine-readable medium, comprising machine-readable instructions, that when executed by a processor, cause the processor to:

receive, in real time, sensor data from a plurality of ultra-wideband (UWB) sensors inside a vehicle, wherein the plurality of UWB sensors includes a plurality of UWB anchors each disposed in a fixed position inside the vehicle and at least one UWB tag that is not in a fixed position relative to the vehicle, the UWB tag is part of a mobile device, and the sensor data includes a location information about the UWB anchors and a distance from the UWB tag to each of the UWB anchors;

determine a plurality of location candidates of the UWB tag based on the sensor data received from the plurality of UWB sensors;

determine a plurality of sensed current locations of the UWB tag and a plurality of probabilities for each of the plurality of sensed current locations of the UWB tag using a Gaussian Kernel Density Estimation (KDE) based on the location candidates of the UWB tag;

track a motion of the UWB tag by generating a probability matrix ($p_{mot}$) through applying a Gaussian KDE to motion-predicted locations (Lk), wherein the probability matrix represents a distribution of possible tag locations over time; and determine a real-time position of the UWB tag using a Bayesian estimation, the plurality of sensed current locations of the UWB tag, the motion of the UWB tag, and the plurality of probabilities for each of the plurality of sensed current locations of the UWB tag;

determining a real-time location of the UWB tag by Bayesian estimation that multiplies the probability matrix (pmot) with a probability matrix ($p_{mea}$) generated from sensed current locations of the UWB tag via Gaussian KDE, and selecting a maximum probability from the resulting distribution within the vehicle, wherein the motion of the UWB tag is tracked using a following equations:

$$L_k = L_{k-1} + \delta t * v + 0.5 * a * \delta t^2$$

$$p_{mot} = KDE(L_k)$$

where:

k is a timestamp;

$L_k$ is a current location at timestamp k;

$L_{k-1}$ is a previous location at timestamp k−1;

$\delta t$ is a time span between timestamp k and timestamp k−1 v is a moving speed of the UWB tag:

a is a movement acceleration of the UWB tag;

$p_{mot}$ is a probability matrix predicted by a motion tracking; and

KDE is a Kernel Density Estimation, wherein the Bayesian estimation uses a following equation:

$$\alpha = \max\left(p_{mot}^k * p_{mea}^k\right),$$

where:

$p_{mot}{}^k$ is the probability matrix predicted by the motion tracking;

$p_{mea}{}^k$ is a probability matrix predicted by a sensor measurement through the KDE; and $\alpha$ is a maximum probability chosen from element-wise-multiplication between $p_{mot}{}^k$ and $p_{mea}{}^k$.

12. The tangible, non-transitory, machine-readable medium of claim 11, wherein each of the plurality of location candidates includes coordinates in a three-dimensional space.

13. The tangible, non-transitory, machine-readable medium of claim 12, wherein the plurality of UWB anchors includes a first UWB anchor, a second UWB anchor, and a third UWB anchor, each of the plurality of location candidates of the UWB tag includes three-dimensional coordinates, and the three-dimensional coordinates for each of the plurality of location candidates is obtained using a following equations:

$$(x - x_1)^2 + (y - y_1)^2 + (z - z_1)^2 = r_1^2$$

$$(x - x_2)^2 + (y - y_2)^2 + (z - z_2)^2 = r_2^2$$

$$(x - x_3)^2 + (y - y_3)^2 + (z - z_3)^2 = r_3^2$$

where:

(x, y, z) are coordinates that represent a location of the UWB tag;

$(x_1, y_1, z_1)$ are coordinates that represent a location of the first UWB anchor;

$(x_2, y_2, z_2)$ are coordinates that represent a location of the second UWB anchor;

$(x_3, y_3, z_3)$ are coordinates that represent a location of the third UWB anchor; and $r_1$ is a measured distance from the UWB tag to the first UWB anchor;

$r_2$ is a measured distance from the UWB tag to the second UWB anchor; and $r_3$ is a measured distance from the UWB tag to the third UWB anchor.

14. The tangible, non-transitory, machine-readable medium of claim 13, wherein the tangible, non-transitory, machine-readable medium further comprising machine-readable instructions, that when executed by the processor, causes the processor to determine a KDE bandwidth using Silverman's rule of thumb.

15. The tangible, non-transitory, machine-readable medium of claim 14, wherein the KDE bandwidth is determined using a following equation:

$$h = 0.9 \left( \hat{\sigma}, \frac{IQR}{1.34} \right) n^{-\frac{1}{5}}$$

where:

$h$ is the KDE bandwidth;

$\hat{\sigma}$ is a standard deviation of a dataset;

IQR is interquartile range, which is a measure of where ethe middle 50% of data of the dataset (between the 0.25 and 0.75 quantiles); and N is a number of samples in the dataset.

\* \* \* \* \*